Figure 1:
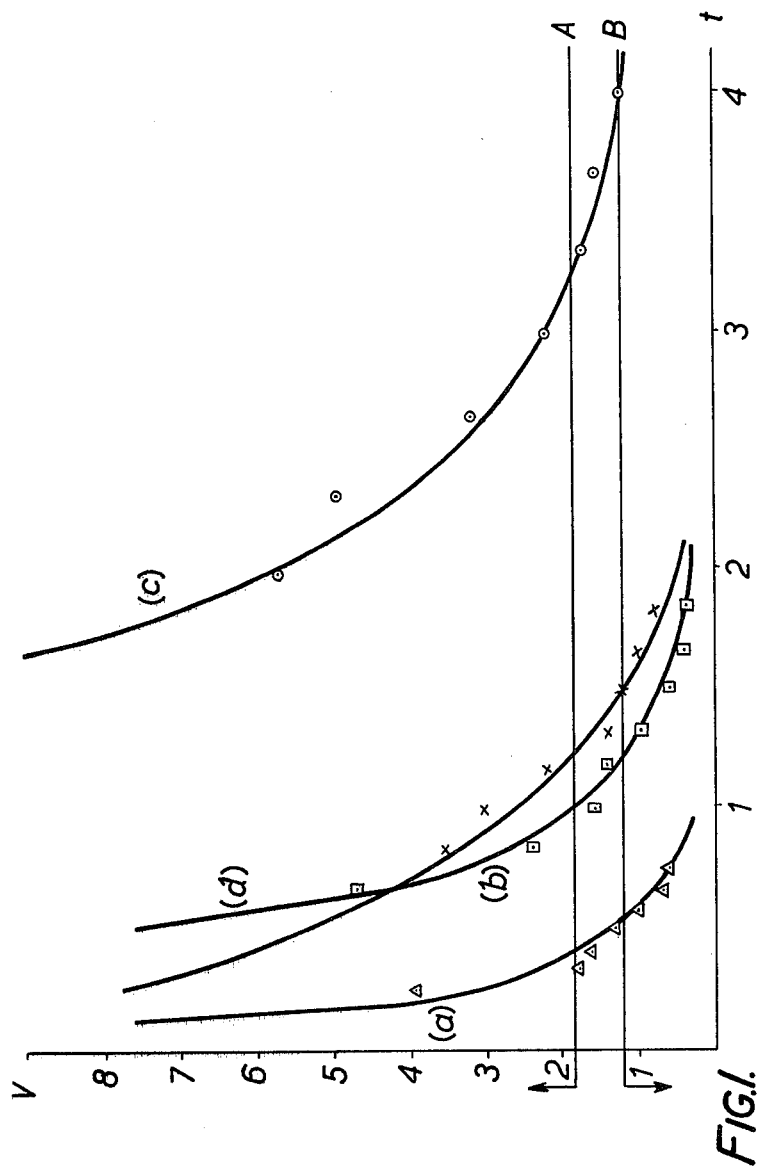

United States Patent [19]

Ferro et al.

[11] 4,089,995

[45] May 16, 1978

[54] PHOSPHORESCENT MATERIALS

[75] Inventors: Berkeley Michael Ferro, Barnehurst; Rodney Edwin Spratling, Sittingbourne; Aubrey Douglas Walker, North Harrow, all of England

[73] Assignee: Post Office, London, England

[21] Appl. No.: 748,161

[22] Filed: Dec. 7, 1976

Related U.S. Application Data

[62] Division of Ser. No. 543,154, Jan. 22, 1975, Pat. No. 4,022,709.

[30] Foreign Application Priority Data

Jan. 25, 1974 United Kingdom ................ 3478/74

[51] Int. Cl.$^2$ ................ G09F 3/00; C09D 11/10; C09K 11/06
[52] U.S. Cl. .................................. 427/157; 283/22; 428/211; 428/530
[58] Field of Search ................ 427/157; 252/301.35; 106/20, 21, 22, 23; 283/22; 428/211, 530

[56] References Cited

U.S. PATENT DOCUMENTS

| 2,541,184 | 2/1951 | Ackerman | 427/157 X |
|---|---|---|---|
| 3,214,382 | 10/1965 | Windsor | 252/301.35 |
| 3,214,383 | 10/1965 | Moore et al. | 252/301.35 |
| 3,412,036 | 11/1968 | McIntosh | 252/301.35 |
| 3,671,451 | 6/1972 | Butterfield | 252/301.35 |
| 3,812,052 | 5/1974 | Weston | 252/301.35 |
| 3,867,302 | 2/1975 | Takano et al. | 252/301.35 X |
| 3,922,232 | 11/1975 | Schein | 252/301.35 |

*Primary Examiner*—James R. Hoffman
*Attorney, Agent, or Firm*—Hall & Houghton

[57] ABSTRACT

A method of rendering a surface, especially a paper surface, phosphorescent, in which a composition comprising a phosphorescence activator and a soluble condensation product of formaldehyde and an amino compound is applied to the surface and is allowed to react in situ to form a phosphorescent insoluble condensation product. The composition may, for example, be in the form of a printing ink or a paper-coating mix.

28 Claims, 2 Drawing Figures

PHOSPHORESCENT MATERIALS

RELATED APPLICATIONS

This application has been divided out from our co-pending application Ser. No. 543,154 filed on Jan. 22, 1975, now U.S. Pat. No. 4,022,709.

The present invention relates to materials for making phosphorescent coatings and the application of such materials to surfaces in order to render part or whole of the surfaces phosphorescent.

It is known that certain organic compounds which may or may not be fluorescent when irradiated with short-wavelength light will exhibit phosphorescence during and after irradiation when dispersed in a suitable solid matrix, for example, in solid solutions or adsorbates. Such compounds are known as phosphorescence activators. It is known that organic phosphorescence (radiative decay of an excited triplet state) does not occur in the liquid phase, in which non-radiative decay pathways of the relatively long-lived triplet state are more favorable. Phosphorescent printing inks and coating compositions currently available therefore contain solid particles of phosphorescent material dispersed in suitable liquid media.

British Pat. No. 870,504 describes a phosphorescent material formed by reacting formaldehyde in liquid phase with a substance with which it will react to give a solid condensation product, particularly an amino compound such as urea or melamine, in the presence of a phosphorescence activator, to form a strongly phosphorescent solid condensation product. The phosphorescence activator is held in a solid matrix of formaldehyde resin. The material of British Pat. No. 870,504 is a brilliant phosphor; it has a high resistance to moisture and if deactivated by moist conditions can be restored to activity by drying. This material may be used as a phosphorescent ink after grinding to form a fine powder and dispersion in a liquid.

The present invention provides a solution of a phosphoresence activator and a soluble condensation product obtained by reaction of two or more components, which soluble condensation product is capable of further reaction to form an insoluble condensation product that does not substantially absorb ultraviolet light at any absorption frequency of the phosphorescence activator. It is preferred that the insoluble condensation product is substantially without absorption frequencies in the spectral range 250 to 380 nm.

The soluble condensation product, which will hereinafter be referred to as a prepolymer, is generally a material of low molecular weight. The insoluble condensation product, which has a high molecular weight, will be referred to hereinafter as a resin. The formation of the resin from the prepolymer generally occurs by way of cross-linking.

The invention further provides a process for the preparation of a solution as described above, which includes partially condensing, in solution in the presence of a phosphorescence activator, two or more components to form a prepolymer capable of further reaction to give a solid which does not substantially absorb ultraviolet light at any absorption frequency of the phosphorescence activator.

In a preferred embodiment, one of the components which are reacted to form the prepolymer, and, subsequently, the resin, is formaldehyde. Suitable substances with which formaldehyde will react to form a solid resin by way of a soluble prepolymer are amino compounds, especially urea and more especially melamine. As discussed in British Pat. No. 870,504, melamine-formaldehyde resins are more resistant to moisture than are urea-formaldehyde resin; this is advantageous in the present context because of the sensitivity of phosphorescence to moisture. Resins formed from phenolic compounds and formaldehyde are unsuitable for use with most phosphorescence activators because of ultraviolet absorption in the spectral range 250 to 380 nm.

The formation of an insoluble resin from formaldehyde and an amino compound, for example melamine, occurs by way of two different chemical reactions, which are favored by different reaction conditions. The first stage involves the reaction between the components to give a mixture of monomeric and/or oligomeric methylolated melamines; these products constitute the prepolymer. The formation of the prepolymer (methylolation) is favoured by neutral or alkaline conditions. The second stage is the cross-linking of the methylolated monomers and oligomers to give a high-molecular-weight resin; this is favoured by acid conditions.

For the purposes of the present invention, the best results are obtained if the methylolation reaction takes place substantially completely before cross-linking starts, since the functionality of the resin-forming monomers and oligomers (prepolymers) is determined by the extent of methylolation. The greater the functionality of the methylolated prepolymer, the higher the cross-link density, and hence the moisture resistance, of the resin will be.

The solvent in which the activator and prepolymer are dissolved may suitably be water or water mixed with an alcohol, preferably an aliphatic alcohol having from 1 to 4 carbon atoms. The solution may contain one or more stabilizers to inhibit premature conversion of the prepolymer to the finally desired cured resin.

The invention also provides a composition which includes a solution as defined above in admixture or conjunction with one or more fillers and/or binders and/or pigments and/or stabilizers and/or other additives. These other components may or may not be in solution in the solvent.

In one embodiment, the composition of the invention may be a coating mix for coating the surface of paper to be printed; such paper may be used, for example, for the manufacture of postage stamps. In another embodiment, the composition of the invention may be a printing ink, which may be used, for example, for printing phosphorescent bars on sheets of postage stamps, and for applying address codes to mail for use in automatic sorting.

The present invention further provides a process for rendering part or whole of a surface phosphorescent, which comprises the steps of:

(a) applying to the surface a composition which includes a solution, as defined above, of a phosphorescence activator and a soluble condensation product capable of further reaction to give a solid condensation product, and (b) forming the solid condensation product on the surface.

Step (b) may be carried out by various methods; for example, the evaporation of the solvent may be sufficient to cure the resin, or the surface itself may have properties, for example, the pH, which enable it to catalyze the reaction. Curing may also be effected by exposure to an elevated temperature; if necessary, a curing agent may be added to the composition before application to the surface.

As activator, any substances capable of exhibiting phosphorescence when dispersed in a solid matrix may be used. Suitable activators are mainly aromatic compounds, which may be benzenoid, heterocyclic or fused-ring compounds. Aromatic amines, carbonyl compounds, carboxylic and sulphonic acids, ethers and phenols are particularly good activators; examples of such compounds are listed in British Pat. No. 1,002,022.

Depending on the activator used, the phosphorescent material of the invention may be excited by either long (365 nm) or short (254 nm) wavelength ultraviolet light. Examples are given:

| Long-Wavelength (365 nm) Activators | |
| --- | --- |
| Carbazole sulphonic acid | (blue afterglow) |
| Para-aminobenzophenone | (green afterglow) |
| α-naphthoflavone | (yellow afterglow) |
| 8-amino-1-naphthol-3,6-disulphonic acid | (orange-yellow afterglow) |
| 2-naphthylamine-6-sulphonic acid | (yellow-green afterglow) |
| Short-Wavelength (254 nm) Activators | |
| Para-aminobenzoic acid | (violet afterglow) |
| Terephthalic acid | (blue-violet afterglow) |
| Fluorene sulphonic acid | (green-blue afterglow) |
| Diphenylene oxide sulphonic acid | (blue afterglow) |
| 4,4'-dihydroxydiphenyl sulphonic acid | (blue afterglow) |

Phosphors containing short-wavelength activators are generally unaffected by long-wavelength ultraviolet light, but long-wavelength-excited phosphors do show a measurable response to short-wavelength light. Despite this it is still possible to produce two separate sets of phosphorescent marks on one article and read them separately. For example, if one code mark is first applied with short-wavelength-excited phosphor, this can be detected by a suitable photomultiplier for coding, and then a second set of marks applied with long-wavelength-excited phosphor. These can be detected without interference from the first set of marks.

For example, postage stamps may be printed with a short-wavelength-excited phosphor, by means of which letters or other articles of mail may be segregated into first and second-class mail and then "faced," i.e., stacked address upwards with the stamp in the top right-hand corner; address coding marks for automatic sorting may then be applied with a long-wavelength-excited phosphor, so that the stamp phosphor does not interfere with the sorting process.

As previously mentioned, in one embodiment the invention relates to a printing ink, and to printing phosphorescent marks on a surface, particularly on paper. An ink according to the invention may be produced, for example, by reacting excess of a suitable amino compound, preferably melamine, with formaldehyde in aqueous solution, in the presence of a phosphorescence activator, at a pH greater than about 6, preferably at a pH of about 9. The pH may be maintained at about 9, for example, by means of a sodium carbonate/sodium borate buffer. The molar ratio of melamine to formaldehyde is preferably within the range of from 1.1 : 1 to 1.5 : 1. By careful control of the reaction conditions, especially solvent, temperature and pH, a low viscosity solution containing about 20% by weight of a prepolymer of fairly low molecular weight may be obtained. The solution may be stabilized by the addition of an alcohol, preferably methyl, ethyl, isopropyl or n-butyl alcohol, preferably in an amount of up to 20% by volume, advantageously 10 to 15% by volume. Inks differing slightly in properties such as surface tension and viscosity may be obtained by variation of the formulation. Inks according to the invention may have a shelf life of at least 6 months under normal storage conditions without curing of the prepolymer taking place.

A printing ink according to the invention may be completely non-particulate, and is therefore very suitable for use in jet printers; conventional particulate phosphor inks tend to block the nozzles of jet printers by agglomeration of the particles. Forced drying of the printed surface may be used to accelerate evaporation of the solvent and curing of the resin; for example, an infra-red beam parallel to the surface and slightly above it and focused above the actual printing area may be used, so that the drops of ink are almost dry by the time they hit the surface. The use of a beam parallel to the surface ensures that the surface itself is not damaged; such a system may be achieved using appropriate reflecting and focusing devices. Use of paper having a weakly acid reaction also accelerates curing.

In another embodiment, the invention is concerned with an overall coating for paper which can be rendered phosphorescent by exposure to ultraviolet radiation. The invention accordingly provides a paper-coating composition comprising a solution, preferably an aqueous solution, according to the invention, in admixture or conjunction with one or more pigments and/or binders and/or other components conventionally used in a paper-coating composition. The coating composition according to the invention may be prepared by mixing the prepolymer solution of the invention with a conventional coating mix, which generally consists of an aqueous suspension of pigments, binders and other additives. The wet-coating composition should preferably not contain more than 20% by weight of the prepolymer solution, otherwise difficulties may be experienced when printing on the coated papers.

If desired, a curing agent (cross-linking agent) may be added to the prepolymer solution immediately before mixing with the coating mix.

The coating composition may be applied to paper using conventional equipment; the coated paper may then be dried, for example by passing it through a heated tunnel or over heated rollers. If the degree of heating is insufficient to cure the resin completely at this stage, the curing will continue slowly at ambient temperature.

The preparation of an aqueous solution according to the invention for use in a paper coating mix is preferably carried out at a pH within the range of 6 to 9, preferably 6 to 8, and more preferably 6 to 7, preferably at a temperature of from 70 to 80° C, for example, 75° C. The higher the pH of the reaction mix, the longer the reaction takes at any given temperature and the more closely the degree of reaction of the final product may be controlled. The pH may be adjusted by means of, for example, sodium hydroxide or calcium carbonate. In the case of calcium carbonate the pH may be maintained at approximately 6.2 by the presence of excess of this reagent. The extent of reaction in the formation of the soluble prepolymer is important and may conveniently be monitored by measurement of the miscibility of the reaction mixture with water, i.e., titration with water until the mixture becomes turbid due to precipitation of a solid resin; the maximum volume of water with which one volume of prepolymer solution may be mixed without causing turbidity is commonly referred to as the water tolerance of the solution. The extent of reaction may alternatively be monitored by measurement of the viscosity of the reaction mixture. This method must be used if calcium carbonate is used for adjustment of pH, since excess of this reagent renders the solution turbid so that water tolerance is difficult to determine.

In a preferred embodiment, the conversion of the soluble condensation product (prepolymer) to the solid resin is promoted by the addition of a catalyst, to promote cross-linking of the prepolymer, immediately before the prepolymer solution is added to the other components of the coating mix; the catalyst is preferably an acid, for example sulphuric or acetic acid.

The extent of reaction in the formation of the soluble condensation product (prepolymer) is important if it is to be used in a coating mix since if it is not sufficiently reacted at this stage the resistance of the final coating to de-activation of phosphorescence by moisture is impaired, while if it is reacted too far the prepolymer solution will not form a homogeneous mixture with the coating formulation and the product then has unsatisfactory coating and printing properties. Thus the most satisfactory results are obtained when the reaction is allowed to go as far as possible as is consistent with the production of a homogeneous coating mix. The extent of reaction allowable depends on the nature of the pigment/binder system used and also on the solids content of the mix.

For the preparation of a typical coating composition having a 50% solids content and containing 15-20% of the prepolymer solution, a solution of water tolerance of 2.0 to 2.5 volumes of water to 1 volume prepolymer solution is suitable. The viscosity which corresponds to this water tolerance is dependent on the pH of the prepolymer solution. Examples of approximate viscosity values, together with reaction times, at different pH values, for completion of the prepolymer stage, are given below:

| pH | Temperature | Reaction Time (minutes) | Viscosity of prepolymer solution at water tolerance (cp) |
|---|---|---|---|
| 8.5 | 75° C | 190 | 13-15 |
| 7.4 | " | 60 | 10-12 |
| 6.0 | " | 25 | 7-9 |
| 9.0 | 92° C | 70 | 12-14 |

Paper coated with a coating composition according to the invention may be used, for example, in the production of postage stamps; for this application, a short-wavelength-excited activator, for example, p-aminobenzoic acid (PAB) or terephthalic acid (TPA), is preferably used, to prevent interference with automatic sorting processes in which long-wavelength-excited address code markings are used.

Figure 2:
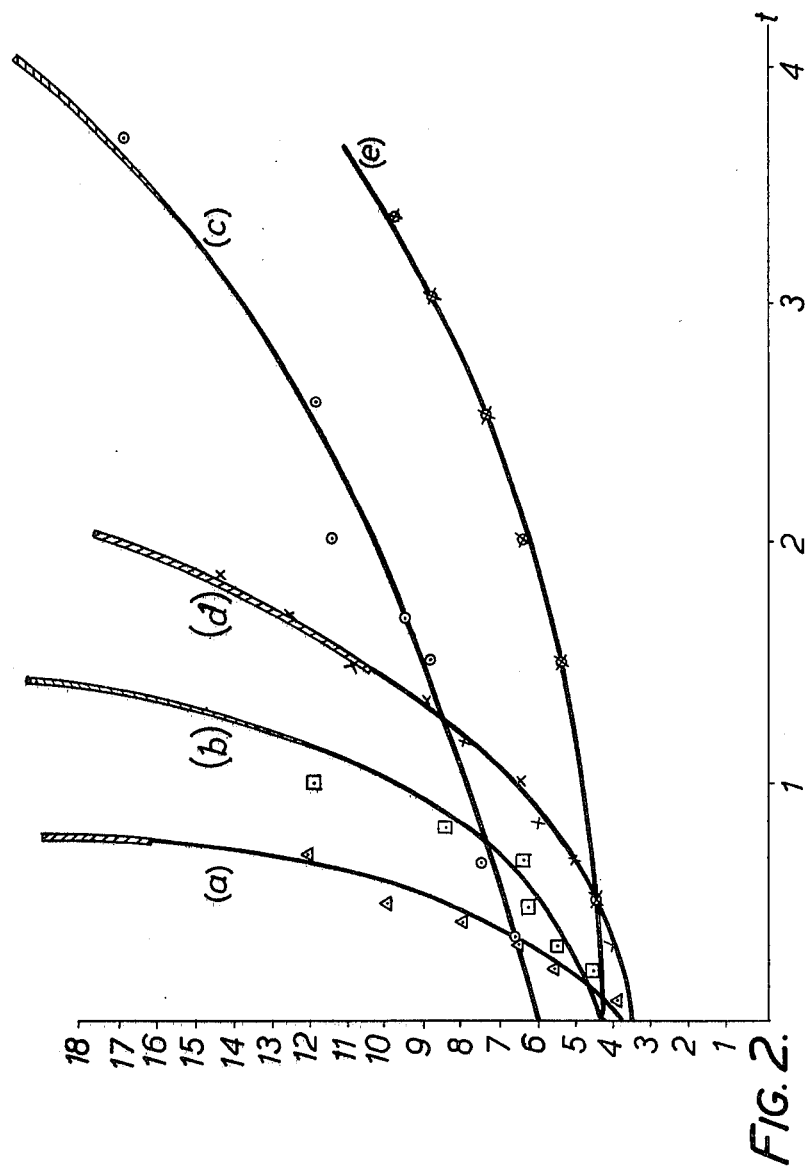

The following Examples illustrate the invention, and in Example 3, reference will be made to the accompanying drawings, in which:

FIG. 1 represents a graph showing the volumes of water required to produce turbidity in 1 volume of four different precondensate solutions prepared for the production of a paper-coating mix according to the invention, as a function of the reaction times of the precondensate solutions; and FIG. 2 represents a graph showing the viscosities, as a function of reaction time, of five different precondensate solutions for use in the production of a paper-coating mix according to the invention; four of the five curves relate to the four solutions to which the curves in FIG. 1 relate.

EXAMPLE 1

Preparation of a printing ink 850 g melamine (1.3 moles) were mixed with 400 g 37% aqueous formaldehyde (1 mole), the suspension was stirred, and 300 ml buffer solution (sodium carbonate/sodium borate pH 9.2) added to give a pH of about 9. 20 g carbazole-sulphonic acid sodium salt were then added (approximately 14% by weight based on formaldehyde) and sufficient water was added to give a total liquid volume of about 2½ liters. The suspension was stirred and heated to reflux, and this temperature was maintained for 50-60 minutes. The heat source was removed and 300-400 ml methanol were added. Stirring was continued until the mixture had cooled. It was then allowed to stand at room temperature for about eighteen hours. The liquid was then decanted; this yielded about 2½ liters of ink.

The recovered solid (350 g) was washed with 50/50 alcohol/water, dried and re-used as follows: 350 g recovered solid was mixed with 450 g of fresh melamin; 300 ml of buffer pH 9.2 and 350 g of 37% aqueous formaldehyde solution were then added. After addition of the carbazolesulphonic acid sodium salt and water, the preparation was carried out as described above. A further yield of about 2½ liters of ink was obtained.

The aqueous ink had a low viscosity and contained about 20% by weight of a fairly low molecular weight prepolymer. About 10 to 15% by volume of alcohol was added as stabilizer and the solution was stored for 6 months; no obvious increase in viscosity had occurred at the end of this period.

The ink was applied to paper in a thin film; it became smudge-free in about a second and became increasingly phosphorescent as it dried. When the film was wetted, the phosphorescence was quenched, but after drying the film was again phosphorescent.

EXAMPLE 2

Preparation of a paper-coating mix 24 g p-aminobenzoic acid and 6.5 g sodium hydroxide were dissolved with warming in 75 ml water; the pH of this solution was about 9. The solution was added to 1.8 liters of 40% aqueous formaldehyde solution, the mixture was heated to 75° C and the pH adjusted to 8 by the addition of further alkali. 1.2 kg melamine powder was added and the temperature of the mix was maintained at 75° C with efficient stirring. The melamine dissolved to give a clear yellow solution after 10-15 minutes. The pH was maintained at 8.

Half an hour after the addition of the melamine, a 10 ml sample was withdrawn from the solution and titrated with water until the mixture became turbid. Samples were taken at 10 to 15 minutes intervals. As the reaction proceeded, the quantity of water required to precipitate solid resin from the solution decreased and the viscosity of the prepolymer solution increased. When the reaction had proceeded to a point at which 2½ - 3 volumes of water were sufficient to produce turbidity in 1 volume of solution, the solution was mixed with an aqueous coating mix consisting of pigment and binder as described previously with constant stirring. The resulting wet coating composition contained about 20 percent by weight of prepolymer solution.

EXAMPLE 3

A series of experiments were carried out, in which solutions were prepared according to the procedure of Example 2 under various pH and temperature conditions:
(a) Temperature 75° C, pH of mixture 6.1
(b) Temperature 75° C, pH of mixture 7.4
(c) Temperature 75° C, pH of mixture 8.5
(d) Temperature 92° C, pH of mixture 9.0

The amount of water required to make the reaction mixture turbid was measured as a function of reaction time; the results are shown in FIG. 1 of the accompanying drawings, wherein $t$ is the reaction time in hours and $V$ is the number of volumes of water required to product turbidity in 1 volume of reaction solution. It was found that a prepolymer solution whose extent of reaction is within the area above the line A produces a smooth homogeneous coating composition when mixed with a conventional coating mix containing pigment and binder in suitable quantities. Solutions whose extent of reaction is in the area below the line B will not give satisfactory coating mixes. Between the lines A and B, rather thick but otherwise satisfactory mixes are obtained.

It may be seen that, out of the four sets of reaction condition tried, a pH of 8.5 and a temperature of 75° C gave the slowest, and therefore most controllable, reaction.

FIG. 2 shows the viscosity of the reaction mixture, $\eta$, in cp, as a function of reaction time $t$ in hours. In addition to the four runs (a) to (d), a fifth run (e) was carried out at pH 9.7 and 75° C. The shaded portion of each curve indicates where the resin solution produced a thick or unsatisfactory coating mix.

EXAMPLE 4

Preparation of a coating mix — alternative procedure 24 g p-aminobenzoic acid was dissolved in 200 ml of hot water, and precipitated calcium carbonate solution was slowly added until effervescence ceased; about 25 g calcium carbonate was required. The solution had a pH of about 6.2.

The activator solution was added to 1.8 liters 40% aqueous formaldehyde solution, and the pH was maintained at 6.2 by the addition of more calcium carbonate if necessary.

Melamine (1.2 kg) was added and the reaction carried out at 75° C as in Examples 2 and 3. At this pH, however, the reaction proceeds more rapidly than at the higher pH used in the previous Examples; it was complete in 20–30 minutes.

The extent of reaction was monitored by measurement of the viscosity of the solution. The end point was taken to be when the solution had a viscosity of 10 – 12 cp. A coating mix was then prepared as in Example 2.

EXAMPLE 5

Preparation of a coating mix containing an acidic curing agent

An activator solution was prepared by dissolving 30 g p-aminobenzoic acid and 8 g solid sodium hydroxide in 250 ml water with heating; the solution had a pH of about 7. 130 ml of this solution were added to 1200 ml formaldehyde and the pH was adjusted to about 6.5. The temperature of the mixture was raised to 75° C and 1200 g melamine powder were added with constant stirring. Reaction of the melamine formaldehyde mix to the prepolymer stage was continued with stirring at 75° C until the water tolerance of the solution, determined as described above, was about 2½ : 1. The time required for the reaction was approximately 40 mins. Sulphuric acid (24 ml of a solution prepared by mixing 100 ml concentrated sulphuric acid and 750 ml water) was added to the solution with vigorous stirring and immediately afterwards the resulting solution was added to approximately 15 kg of coating mix, the solution/coating mix proportion having been chosen to give the required phosphorescent intensity.

We claim:
1. A process for rendering at least part of a surface phosphorescent, which includes the steps of
   (a) applying to said at least part of said surface a composition comprising a solution of a phosphorescence activator and a soluble precondensate obtained by a reaction between formaldehyde and an amino compound, which precondensate is capable of further reaction in the absence of the phosphorescence activator whereby there is formable an insoluble condensation product that does not substantially absorb ultraviolet radiation at any wavelength at which the phosphorescence activator substantially absorbs ultraviolet radiation, and is capable of such further reaction in the presence of the phosphorescence activator to form a phosphorescent insoluble condensation product, and
   (a) by such further reaction forming the phosphorescent insoluble condensation product in situ on said at least part of said surface.

2. A process as claimed in claim 1, wherein the phosphorescent insoluble condensation product formable by such further reaction in the absence of the phosphorescence activator does not substantially absorb ultraviolet radiation at any frequency within the range of from 250 to 380 nm.

3. A process as claimed in claim 1, wherein the soluble precondensate has been obtained by the reaction of the amino compound, in molar excess, with formaldehyde.

4. A process as claimed in claim 3, wherein the soluble precondensate is the product of the reaction of from about 1.1 to about 1.5 moles of melamine per mole of formaldehyde.

5. A process as claimed in claim 1, wherein the solvent comprises water.

6. A process as claimed in claim 5, wherein the solution has a pH within the range of from 6 to 9.5.

7. A process as claimed in claim 1, wherein the surface is a paper surface.

8. A process as claimed in claim 1, wherein the composition is a printing ink and is applied to said at least part of said surface by a printing method.

9. A process as claimed in claim 8, wherein the composition is applied to the surface by jet printing.

10. A process as claimed in claim 8, wherein the ink has a pH within the range of from 8.5 to 9.5.

11. A process as claimed in claim 8, wherein the ink contains at least one stabilizer.

12. A process as claimed in claim 8, wherein the solvent of the ink comprises water in admixture with at least one aliphatic alcohol having from 1 to 4 carbon atoms.

13. A process as claimed in claim 12, wherein the solvent contains from about 10 to about 15 percent by volume of alcohol.

14. A process as claimed in claim 8, wherein step (b) is effected by evaporation of the solvent at ambient temperatures.

15. A process as claimed in claim 8, wherein step (b) is effected by exposure of the coated paper to an elevated temperature.

16. A process as claimed in claim 1, wherein the composition is an aqueous paper-coating mix and is coated onto paper.

17. A process as claimed in claim 16, wherein the paper-coating mix has a pH within the range of from 6 to 8.

18. A process as claimed in claim 16, wherein the paper-coating mix contains sodium hydroxide or calcium carbonate.

19. A process as claimed in claim 16, wherein a catalyst for the formation of the insoluble condensation product is added to the composition before it is applied to the paper.

20. A process as claimed in claim 19, wherein the catalyst is acidic.

21. A process as claimed in claim 16, wherein step (b) is effected by exposure of the coated paper to an elevated temperature.

22. A process as claimed in claim 16, wherein the paper-coating mix also comprises at least one adjuvant selected from the group consisting of fillers, binders, pigments and stabilizers.

23. A process as claimed in claim 16, wherein the paper-coating mix is prepared by mixing a precondensate/phosphorescence activator solution with an aqueous mix comprising at least one adjuvant selected from the group consisting of fillers, binders, pigments and stabilizers and the resulting mix is subsequently coated onto the paper.

24. A process as claimed in claim 16, wherein the paper-coating mix is prepared by mixing a precondensate/phosphorescence activator solution having a water tolerance within the range of from 2.0 to 2.5 with an aqueous mix comprising at least one adjuvant selected from the group consisting of fillers, binders, pigments and stabilizers, and the resulting mix is subsequently coated onto the paper.

25. Paper carrying on its surface printed matter comprised by a phosphorescent insoluble condensation product formed by the in-situ condensation reaction of a soluble precondensate of formaldehyde and an amino compound in the presence of a phosphorescence activator, the precondensate being such that, by a condensation reaction in the absence of the phosphorescence activator, it would form a condensation product that does not substantially absorb ultraviolet radiation at any wavelength at which the phosphorescence activator substantially absorbs ultraviolet radiation.

26. A postage stamp comprising paper as claimed in claim 25.

27. Paper having a surface coating comprising a phosphorescent insoluble condensation product formed by the in-situ condensation reaction of a soluble precondensate of formaldehyde and an amino compound in the presence of a phosphorescence activator, the precondensate being such that, by a condensation reaction in the absence of the phosphorescence activator, it would form a condensation product that does not substantially absorb ultraviolet radiation at any wavelength at which the phosphorescence activator substantially absorbs ultraviolet radiation.

28. A postage stamp comprising paper as claimed in claim 27.

* * * * *